(12) United States Patent
Shankar et al.

(10) Patent No.: US 8,023,559 B2
(45) Date of Patent: Sep. 20, 2011

(54) MINIMIZING BLOCKING ARTIFACTS IN VIDEOS

(75) Inventors: Sumankar Shankar, Chennai (IN); Prasanna Ganesan, Menlo Park, CA (US)

(73) Assignee: Vudu, Inc., Santa Clara, CA (US)

( * ) Notice: Subject to any disclaimer, the term of this patent is extended or adjusted under 35 U.S.C. 154(b) by 1521 days.

(21) Appl. No.: 11/244,885

(22) Filed: Oct. 6, 2005

(65) Prior Publication Data
US 2009/0022418 A1  Jan. 22, 2009

(51) Int. Cl.
*G06K 9/46* (2006.01)
(52) U.S. Cl. .... 375/240; 382/173; 382/268; 375/240.12
(58) Field of Classification Search .................. 375/240, 375/240.29, 240.12, 240.27; 382/173, 232, 382/236, 268, 298
See application file for complete search history.

(56) References Cited

U.S. PATENT DOCUMENTS

| | | | |
|---|---|---|---|
| 6,151,420 A * | 11/2000 | Wober et al. ................ | 382/275 |
| 6,389,074 B1 * | 5/2002 | Andrew .................... | 375/240.05 |
| 6,529,638 B1 * | 3/2003 | Westerman ................... | 382/275 |
| 6,628,711 B1 * | 9/2003 | Mathew et al. .......... | 375/240.12 |
| 6,643,410 B1 * | 11/2003 | Yu et al. .................... | 382/268 |
| 6,950,473 B2 * | 9/2005 | Kim et al. ................. | 375/240.29 |
| 7,076,114 B2 * | 7/2006 | Westerman .................. | 382/275 |
| 7,650,043 B2 * | 1/2010 | Shim et al. .................. | 382/268 |
| 2003/0095197 A1 * | 5/2003 | Wheeler et al. ............... | 348/241 |
| 2003/0118251 A1 * | 6/2003 | Hamza .......................... | 382/308 |
| 2003/0235248 A1 * | 12/2003 | Kim et al. ................. | 375/240.12 |
| 2004/0057631 A1 * | 3/2004 | Kim et al. ..................... | 382/268 |
| 2005/0036697 A1 * | 2/2005 | Shim et al. .................... | 382/233 |
| 2005/0117807 A1 * | 6/2005 | Shohdohji .................... | 382/233 |
| 2005/0207670 A1 * | 9/2005 | Lesellier et al. ............. | 382/275 |
| 2005/0243916 A1 * | 11/2005 | Kwon et al. ............. | 375/240.03 |
| 2005/0243920 A1 * | 11/2005 | Murakami et al. ....... | 375/240.12 |
| 2006/0115167 A1 | 6/2006 | Itokawa | |

OTHER PUBLICATIONS

Non-Final Office Action dated Jun. 2, 2010 in U.S. Appl. No. 11/331,112; 17 pages.

* cited by examiner

*Primary Examiner* — Wesley Tucker
*Assistant Examiner* — Aklilu K Woldemariam
(74) *Attorney, Agent, or Firm* — Mahamedi Paradice Kreisman LLP

(57) ABSTRACT

Techniques for minimizing blocking artifacts in video images or frames are disclosed. In general, these blocking artifacts are the result of block-based compression standards, such as MPEG-1, MPEG-2, MPEG-4, H.261, H.263, and H.264. According to one aspect of the present invention, a blurring process is configured to replace pixels on the blocking boundaries with randomly selected pixels within respective regions, each of the regions is predefined with respect to a pixel being replaced. In a certain perspective, a blocking boundary is diffused without introducing blurring to other than the blocking artifacts. According to another aspect to the present invention, pixels in an image or frame are sequentially processed by a moving average process that is configured to smooth only those pixels that may cause subjective perception of the blocking artifacts.

25 Claims, 5 Drawing Sheets

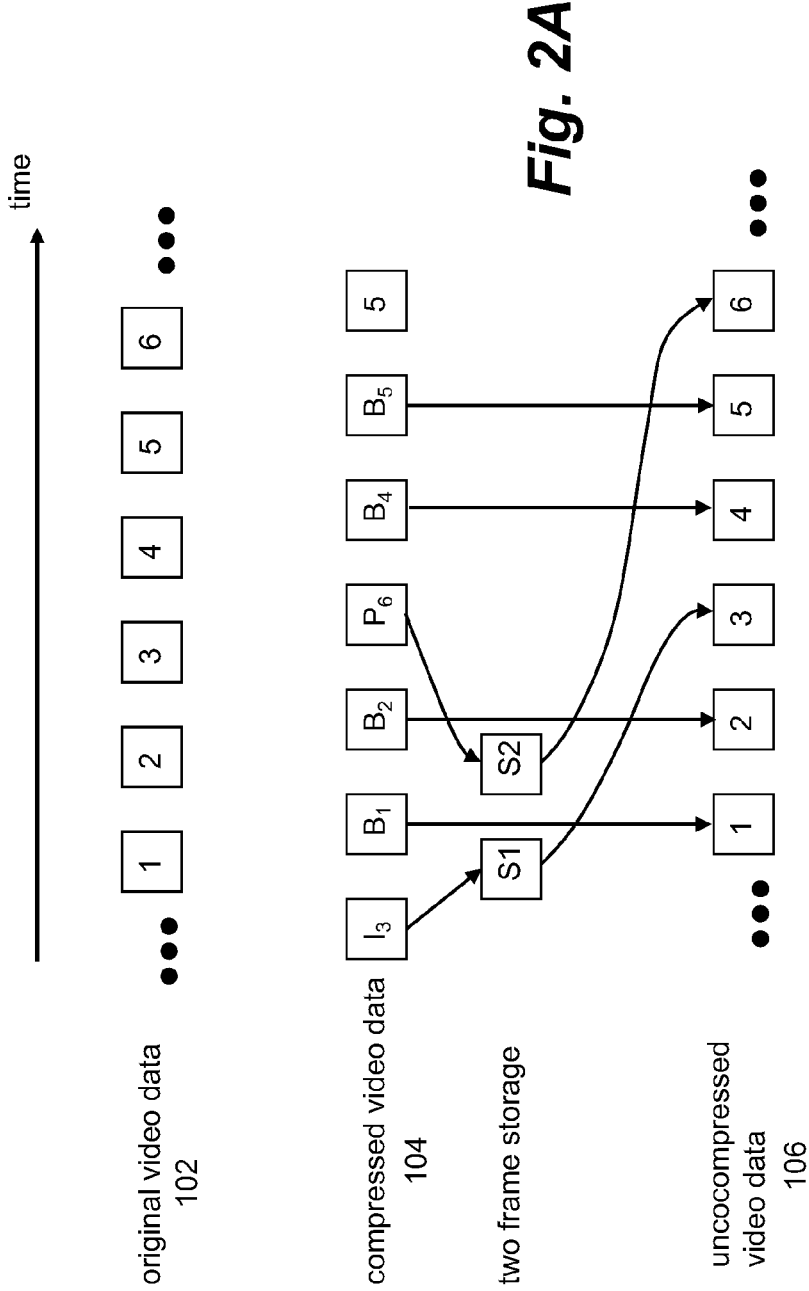

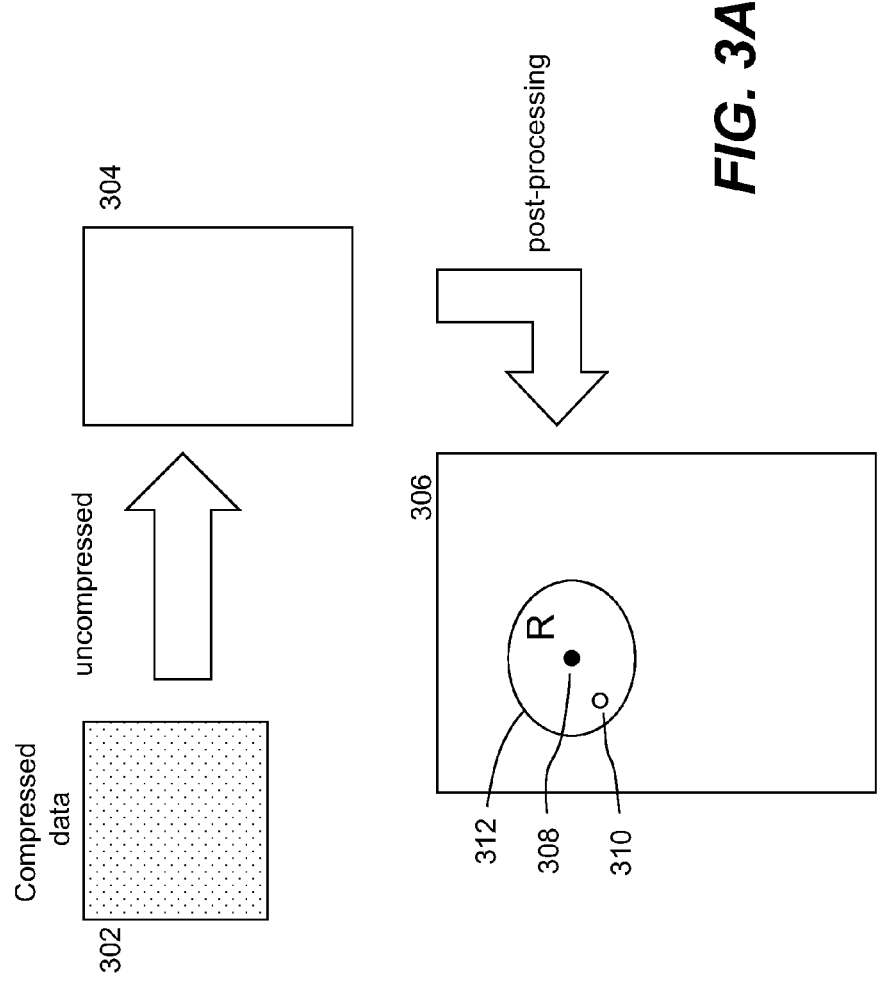

MINIMIZING BLOCKING ARTIFACTS IN VIDEOS

BACKGROUND

1. Technical Field

The present invention relates generally to image processing, and more particularly to techniques for minimizing blocking artifacts in videos.

2. Description of the Related Art

Compression is a reversible conversion of data to a format that requires fewer bits, usually so performed that the data can be stored or transmitted more efficiently. In the area of video applications, compression or coding is performed when an input video stream is analyzed and information that is indiscernible to the viewer is discarded. Each event is then assigned a code—commonly occurring events are assigned few bits and rare events have more bits. The common techniques for video compression (e.g., MPEG-1, MPEG-2) divide images in small square blocks for processing. However, real objects in a scene are rarely a collection of square regions. Such block-based coding technique is used in many video compression standards, such as H.261, H.263, H.264, MPEG-1, MPEG-2, and MPEG4. When the compression ratio is increased, the compression process can create visual artifacts in the decoded images when displayed, referred to as blocking artifacts. The blocking artifacts occur along the block boundaries in an image and are caused by the coarse quantization of transform coefficients.

Image filtering techniques can be used to reduce the blocking artifacts in reconstructed images. The reconstructed images are the images produced after being inverse transformed or decoded. The rule of thumb in these techniques is that image edges should be smoothed while the rest of the image is preserved. Low pass filters are carefully chosen based on the characteristic of a particular pixel or set of pixels surrounding the image edges. In particular, non-correlated image pixels that extend across block boundaries in images are specifically filtered to reduce the blocking artifacts. However, such ideal low pass filtering is difficult to design, the commonly used low pass filtering can introduce blurring artifacts into the image. If there are little or no blocking artifacts between adjacent blocks, the low pass filtering may needlessly incorporate blurring into the image while at the same time wasting processing resources.

Various techniques have been proposed to remove the artifacts while preserving the video quality. One of the techniques is to determine the differences in least significant bits (LSB). For example, two adjacent pixels A and B along an image boundary have values 100 and 101 respectively, on a scale of 0 to 255 (8-bit precision). To simply remove the image boundary, it is ideal to replace both pixels with an average value 100.5. But given an 8-bit precision representation for the pixel values, the value 100.5 needs to be rounded up or down. In a standard blurring process, 100.5 may be rounded down to 100 for pixel A (since it was originally closer to 100) and rounded up to 101 for pixel B (since it was originally closer to 101). The consequence is that the values of the two adjacent pixels A and B do not change by the blurring method, and the image boundary is not eliminated.

In certain encoding techniques, the block sizes vary depending on the content in a block. Smooth areas sometimes have large blocks. When blurred, the rectangular areas may be still visible. For example, FIG. 1 shows a gray image in which the pixel values are gradually increasing from the top left corner to the bottom right corner. However, human eyes can perceive a lot of bands in the digital image. These bands may be what are referred to as Mach bands that exaggerate the change in intensity at any boundary where there is a discontinuity in magnitude or slope of intensity. Such bands are not desirable in smooth areas in a scene.

Thus techniques are needed to minimize these visual artifacts to preserve or enhance video quality.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for minimizing blocking artifacts in video images or frames. In general, these blocking artifacts are the result of block-based compression standards, such as MPEG-1, MPEG-2, MPEG4, H.261, H.263, and H.264. According to one aspect of the present invention, a blurring process is configured to replace pixels on the blocking boundaries with randomly selected pixels within respective regions, each of the regions is predefined with respect to a pixel being replaced. In a certain perspective, a blocking boundary is diffused without introducing blurring to other than the blocking artifacts. According to another aspect to the present invention, pixels in an image or frame are sequentially processed by a moving average process that is configured to smooth only those pixels that may cause subjective perception of the blocking artifacts.

Depending on implementation, the process contemplated in the present invention may be implemented as post-processing after compressed data is decoded or decompressed, or as an add-on in an in-loop deblocker. The process may be implemented in software, hardware, or a combination of both as a method, an apparatus or a system. According to one embodiment, the present invention is a method for minimizing blocking artifacts in an image, the method comprises determining a pixel to be processed, defining a region with respect to the pixel, and the region including at least eight other pixels. Within the region, a replacement pixel is selected randomly in the defined region to replace the pixel provided a digital level of the replacement pixel is within a threshold T of a digital level of the pixel, or a replacement pixel is calculated in the defined region to replace the pixel in accordance with a function randomly rounding up or down a computed value.

According to one embodiment, the present invention is an apparatus for minimizing blocking artifacts in an image, the apparatus comprises: memory for storing code as a deblocking module, and a processor, coupled to the memory, executing the deblocking module to cause the apparatus to perform operations of: memory for storing code as a deblocking module, determining a pixel to be processed, defining a region with respect to the pixel, the region including at least eight other pixels, and calculating a replacement pixel in the defined region to replace the pixel in accordance with a function randomly rounding up or down a computed value.

One of the objects of the present inventions is to provide techniques for minimizing blocking artifacts in video images or frames.

Other objects, features, advantages, benefits of the invention will become more apparent from the following detailed description of a preferred embodiment, which proceeds with reference to the accompanying drawings.

BRIEF DESCRIPTION OF THE DRAWINGS

The invention will be readily understood by the following detailed description in conjunction with the accompanying drawings, wherein like reference numerals designate like structural elements, and in which:

FIG. 2A shows an MPEG decoding (decompressing) process;

FIG. 3A shows that compressed data received in whole or as streaming is being post-processed to remove the blocking artifacts in one embodiment.

DETAILED DESCRIPTION OF THE INVENTION

Figure 1:
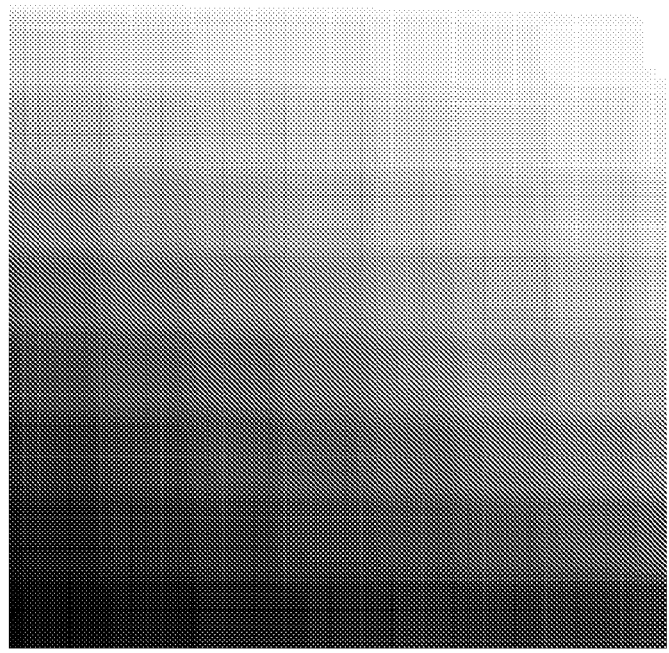
FIG. 1 shows a gray image in which the pixel values are gradually increasing from top left corner to right bottom corner.

The invention is related to various techniques for the present invention is related to techniques for minimizing blocking artifacts in video images or frames. In general, these blocking artifacts are the result of block-based compression standards, such as MPEG-1, MPEG-2, MPEG-4, H.261, H.263, and H.264. According to one aspect of the present invention, a blurring process is configured to replace pixels on the blocking boundaries with randomly selected pixels within respective regions, each of the regions is predefined with respect to a pixel being replaced. In a certain perspective, a blocking boundary is diffused without introducing blurring to other than the blocking artifacts. According to another aspect of the present invention, pixels in an image or frame are sequentially processed by a moving average process that is configured to smooth only those pixels that may cause subjective perception of the blocking artifacts.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments, if any, do not inherently indicate any particular order nor imply limitations in the invention.

Embodiments of the invention are discussed herein with reference to FIGS. 1-3B. However, those skilled in the art will readily appreciate that the detailed description given herein with respect to these figures is for explanatory purposes as the invention extends beyond these limited embodiments To facilitate the understanding of the present invention, it deems necessary to review some concepts in MPEG compression. MPEG (Moving Pictures Experts Group) is a group of people that meet under ISO (the International Standards Organization) to generate standards for digital video (sequences of images in time) and audio compression. In particular, they define a compressed bit stream, which implicitly defines a decompressor. The compression algorithms, however, are up to individual manufacturers, and that is where proprietary advantage is obtained within the scope of a publicly available international standard.

The MPEG compression process starts with a relatively low resolution video sequence (sometimes decimated from the original) of, for example, 352 by 240 frames by 30 frames per second in US and 25 frames per second for most European countries, but original high (CD) quality audio. The images are in color, but converted to YUV space, and the two chrominance components (U and V) are decimated further to 176 by 120 pixels. The basic scheme is to predict motion from one frame to another frame in the temporal direction, and then to use DCTs (Discrete Cosine Transforms) to organize the redundancy in the spatial directions. The DCTs are performed on 8×8 blocks, and the motion prediction is done in the luminance (Y) component on 16×16 blocks. In other words, given the 16×16 block in the current frame being encoded, a close match to that block in a previous or future frame is computed. The DCT coefficients (of either the actual data, or the difference between this block and the close match) are quantized, which means the DCT coefficients are divided by some value to drop bits off the bottom end. Many of the coefficients often end up being zero. The quantization can change for every macroblock (a macroblock is 16×16 of Y and the corresponding 8×8's in both U and V). The results of all of this, which include the DCT coefficients, the motion prediction vectors, and the quantization parameters (and other stuff) is Huffman coded using fixed tables. The DCT coefficients have a special Huffman table that is two-dimensional in that one code specifies a run-length of zeros and the non-zero values that ended the run. Also, the motion prediction vectors and the DCT DC components are coded as well.

There are three types of encoded frames, I or intra frames, P or predicted frames and B (bidirectional) frames. I frames are simply a frame coded as a still image. P frames are predicted from the most recently reconstructed I or P frame. Each macroblock in a P frame can either come with a vector and difference DCT coefficients for a close match in the last I or P, or it can just be intracoded (like in the I frames) if there was no good match. B frames are predicted from the closest two I or P frames, one in the past and one in the future. The sequence of encoded frames usually appears like:

... IBBPBBIBBPBBIBBPBBIB ...

where IBBPBB forms a group of picture (GOP), referred to as S(6, 3), meaning a GOP has 6 "frames" comprising a plurality of subGOP of 3 frames, e.g. IBB or PBB. In other words, this is based on a random access requirement that one needs a starting point at least once every 0.2 seconds or so. It is known there are S(12, 3), S(15, 4) and other GOPs depending on the compressing requirement and television video format in use.

FIG. 2A shows an MPEG decoding (decompressing) process. Original video data 102 is a sequence of S(6,3) GOP, its corresponding MPEG compressed data 104 is being decompressed using two frame storage S1 and S2. As is described, only the I frame can be decompressed independently and the rest of the frames in a GOP is dependent on the decompressed I frame. Therefore the decompressed I frame must be buffered in S1. Similarly to decompress B frames, the corresponding P frame must be decompressed and available. S2 is used to buffer the decompressed P frame. With the decompressed I and P frames buffered in S1 and S2, all the B frames can be sequentially decompressed and then displayed.

A brief description on MPEG, especially applicable to MPEG-1 or MPEG-2, is provided herein to facilitate the description of the present invention. Applications of the present invention to other MPEG standards may be appreciated in conjunction with the above brief description. Nevertheless, MPEG standards including MPEG-1, MPEG-2, MPEG-4, H.261, H.263, and H.264 are not inherent limitations of the present invention. It will be appreciated to those skilled in the art that the disclosed invention can be used with other compression standards as well.

Figure 2B:
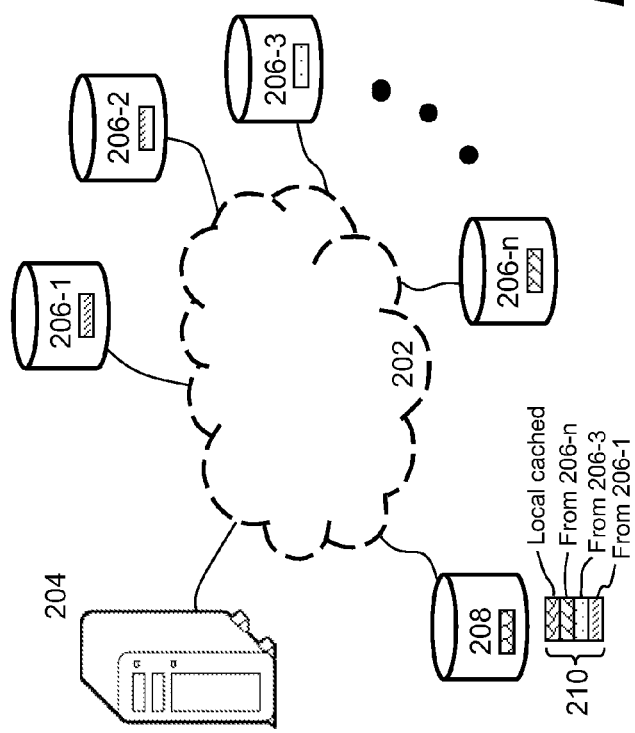
FIG. 2B shows an exemplary configuration system in which the present invention may be practiced.

FIG. 2B shows an exemplary configuration system in which the present invention may be practiced. Coupled to the network 202, there are a server 204 and a plurality of local machines or boxes 206-1, 206-2, 206-3, . . . 206-n and 208. Each of the boxes 206-1, 206-2, 206-3, . . . 206-n and 208 includes or is connected to a display screen (not shown). In one embodiment, each of the boxes 206-1, 206-2, 206-3, . . . 206-n and 208 may correspond to a computing device, a set-top box, or a television. Each of the boxes 206-1, 206-2, 206-3, . . . 206-n and 208 may access compressed data representing one or more movies that may be locally or remotely provided.

According to one embodiment, any of the boxes 206-1, 206-2, 206-3, . . . 206-n and 208 may receive compressed data from the server 204 that centrally stores all video data and delivers required video data pertaining to an ordered title upon receiving a request. According to another embodiment, the server 204 is configured to identify one or more other boxes to supply pieces of compressed data to a box requesting the data. In other words, all video data is distributed among all boxes in service and the server 204 is not required to deliver all the data in response to a request, and instead is configured to provide source information as to where and how to retrieve some or all of the data from other boxes. As shown in FIG. 2B, a set of compressed video 210 for a movie includes four segments, one being locally available, and the other three segments are respectively fetched from the boxes 206-1, 206-3 and 206-n.

Referring now to FIG. 3A, it is assumed that compressed data 302 is received in whole or as streaming. After a reversal (decompression) process, data 304 is decoded or decompressed. It is understood that the data 304 is not exactly the replica of the original data represented by the compressed data 302. Therefore, the data 304 is sometimes referred to as lossy or intermediate data that includes artifacts and needs preferably post-processing before displayed on a screen.

It should be noted herein that a pixel, unless specifically stated, means either a scalar pixel or a vector pixel. Each pixel $C(i, j)$ in a color image or frame is a vector pixel that may be expressed as follows:

$$C(i, j) = \begin{bmatrix} A(i, j) \\ B(i, j) \\ C(i, j) \end{bmatrix}$$

where $(i, j)$ are coordinates of a color image pixel and C refers to the color image and A, B and C are the respective three component intensity images representing the color image C. In the RGB representation, the three components become $R(i, j)$, $G(i, j)$ and $B(i, j)$, wherein R, G, and B represent red, green, and blue component, respectively. In the YUV representation, the three components become $Y(i, j)$, $U(i, j)$ and $V(i, J)$, wherein Y, U, and V represent luminance, and two chrominance. In any case, any computations as described herein may appear to perform on one component but can be understandably applicably to three components.

One aspect of the present invention is to remove or minimize blocking artifacts in the data 304. In one embodiment, a deblocking process is repeated on every single pixel in the data 304, for example, the process is moving across an entire image or frame. The moving process replaces a pixel with another pixel randomly selected within a region R defined with reference to the pixel being processed. As shown in FIG. 3, a pixel 308 is being processed. When predefined criteria are satisfied, the pixel 308 is replaced by another pixel 310 in the region 312. Depending on implementation, the region may be defined to be of quadrilateral, circle or vary in accordance with the pixel or the surrounding pixels thereof.

According to one embodiment, one of the criteria is to compare the value of a pixel to a threshold T. In operation, a replacement pixel in the defined region is randomly selected to replace the pixel being processed, provided that the value or the digital level of the replacement pixel is within a threshold T of the digital level of the current pixel. Large values of R can be chosen without adversely impacting the performance of the process and yet providing deblocking of large blocks. A smoothness condition may be applied before the replacement operation. This smoothness condition avoids replacement of a pixel in areas of high geometric detail by analyzing a small window of pixels around it, for example, in a 3×3 window. If more than a predefined number of pixels in the window differ from the average value (or a median, or a conveniently computable statistical mean function) of the total pixels in the window, the pixel is not considered for the smoothing function. The following is a set of pseudocode according to one embodiment.

In the pseudocode below, it is assumed that screen (x, y) is a pixel at location (x, y) in an image or frame. If x or y are out of bounds (i.e., below 0 or above the width or height of an image, they are assumed to be clipped to 0 or the width/height). The parameters MAXTRIES, RADIUS, THRESHOLD and SMOOTHNESS in the code below can be adjusted. A large RADIUS does not affect the speed of execution and thus even large blocks can be effectively deblocked.

The deblock function:

```
for (i,j) in (0,0)to(width,height) /*for all pixels */
{
    if (is_it_smooth(i,j)) /*is_it_smooth is a function*/
    {
        tries=0;
        while (tries++ < MAXTRIES)
        {
            (ii,jj)= random_within_radius(i,j,RADIUS);
            if (screen[i,j]-screen[ii,jj] < THRESHOLD)
            {
                screen[i,j]=screen[ii,jj];
                break;        /* From while */
            }
        }
    }
}
```

An example of the smoothness function is_it_smooth (i, j) may be implemented as:

```
is_it_smooth(i,j){
    for (ii,jj) in (i-1,j-1)to(i+1,j+1) /* Nine pixels */
    {
        (dif_sum(ii,jj) <SMOOTHNESS)/*dif_sum is a function*/
            return true;
    }
    return false;
}
```

It may be noted that the outer for loop may be removed to provide a subtle alternative.

```
dif_sum(i,j) {
    dif_sum=0;
    for (ii,jj) in (i-1,j-1)to(i+1,j+1) { /* Nine pixels */
        abs=absolute_value(screen[i,j]-screen[ii,jj]);
        dif_sum=dif_sum+abs;
    }
    return dif_sum;
}
```

Figure 3B:
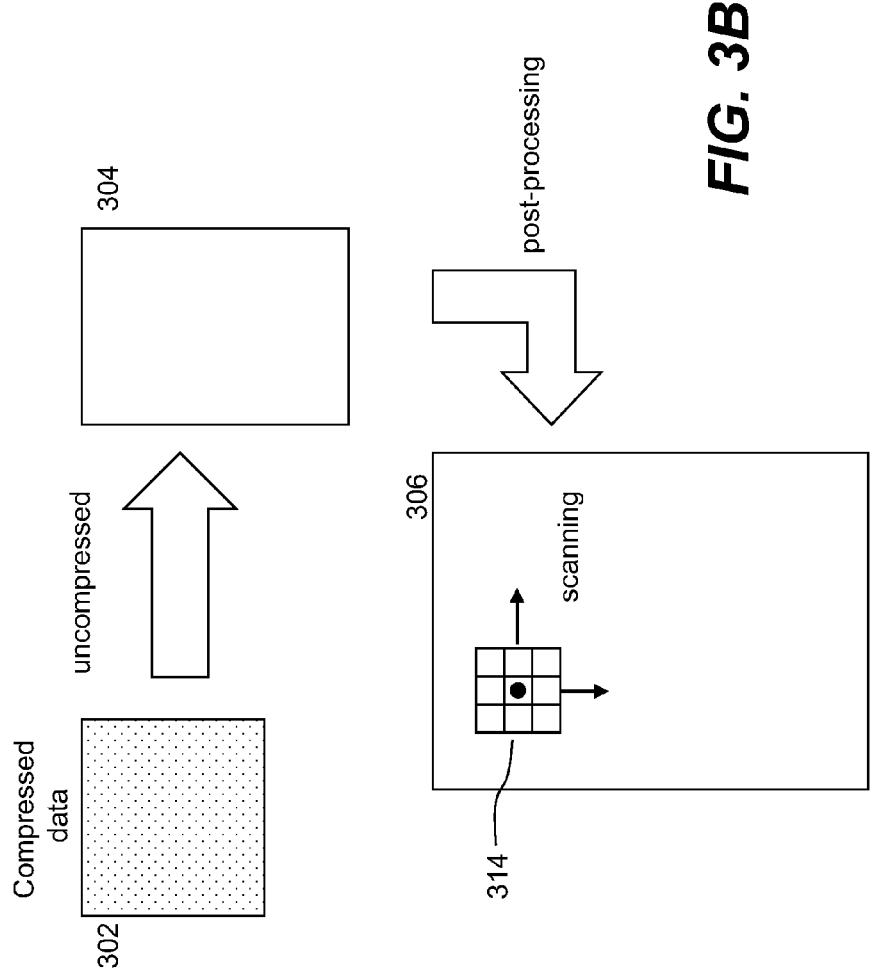
FIG. 3B shows that compressed data received in whole or as streaming is being post-processed to remove the blocking artifacts in another embodiment.

According to another process as shown in FIG. 3B that may be used to minimize blocking artifacts in decompressed images or frames. The pixels in an image 306 are sequentially smoothed by a moving average replacement function 314 that is reset whenever large pixel level differences (set to some level) are encountered. This moving average function 314 works in a predefined window including, for example, 3×3 pixels, and may be applied left to right while scanning through these pixels and then from top to bottom or other scanning to cover the entire image.

The value of a replacement r is computed from a moving average (ma), the current value of the pixel v, and the "streak" s, where
ma=f(v,ma,s)
r=randomized_round(ma)
s=recalc_s(abs(ma-v),s)
The streak "s", roughly represents the number of pixels involved in the moving average. It is also recalculated after every pixel is processed. For small values of abs(ma-v), it increases, and for large values, it decreases. It correlates with the number of pixels chosen in the moving average. For large values of abs(ma-v), the streak is reset to 0, as is ma.

The above function f chooses a value between ma and v, and is weighted by abs(ma-v) and s. In other words, as s increases or abs(ma-v) decreases, the function f chooses a value closer to ma. This value uses higher precision for ma than 8 bit and uses randomized rounding to determine r. To perform top to bottom scanning, these higher precision values along with s are stored for the previous horizontal line filtered. If the higher precision values can be stored for the entire frame, the top to bottom pass can be done after all left to right scans are finished. The following is a set of pseudocode according to one embodiment.

The pseudocode represents an example of left to right blurring replacement scanning. An exemplary implementation for functions f, and recalc_s is respectively provided herewith.

```
ma=0;
s=0;
for (i) in 0 to screenwidth /*screenwidth is an image width*/
{
    ma=f(screen[i,j],ma,s); /*computing a moving average*/
    r=randomized_round(ma); /* randomized_round is a function*/
    s=recalc_s(absolute_value(ma-v),s)/* recalc_s is a function*/
}
f(v,ma,s)
{
    /* Large differences leave pixels unaffected */
    if (absolute_value(ma-v)>THRESHOLD)
        return v;
    /* Else Small differences are weighted by s */
    w1=(s*ma+v)/(s+1);
    /* And by the difference */
    dif=absolute_value(ma-v)*CONSTANT1;
    w2=(w1+dif*v)/(dif+1);
    return w2;
}
recalc_s(dif,s) {
    /* Large differences restore s to 0 */
    if (dif > THRESHOLD)
        return 0;
    /* Small differences increase it by 1 */
    if (dif < LEVEL1)
        return s+1;
    /* Medium differences halve s */
    if (dif > LEVEL2)
        return s/2;
}
```

While most compression standards, such as MPEG-2, use a fixed block size of 16 pixels on a side (referred as 16×16), certain compression standards (e.g., H.264) permit the simultaneous mixing of different block sizes (down to 4×4 pixels). This permits a codec to accurately define fine detail (with more, smaller blocks) while not having to 'waste' small blocks on coarse detail. In this way, for example, patches of blue sky in a video image can use large blocks, while the finer details of a forest in the frame could be encoded with smaller blocks.

It is known that when the bit-rate of an MPEG-2 stream is low, the blocks, specifically the boundaries between them, can be very visible and may clearly detract from the visual quality of the video. A deblocking process is a post-processing step that adaptively smoothes the edges between adjacent blocks. Both FIG. 3A and FIG. 3B show how to eliminate blocking artifacts by post-processing at least a portion of the decoded video by using the techniques described herein.

For the compression standards (e.g., H.264), however, an in-loop deblocking is introduced. The "in-loop" deblocker is actually used as part of the decoding process, and in the decoding 'loop'. After each frame is decoded, the uncompressed data is passed through the in-loop deblocking process in an attempt to eliminate the artificial edges on block boundaries.

Each compression standard, or decoder may specify its own deblocking algorithm. However, these deblocking algorithms often suffer from the same LSB problem that was discussed above. The deblocking algorithms always round up or down deterministically due to limitations in precision, leading to poor deblocking. According to one embodiment, the randomization in the deblocking process as described above is used to achieve dithered edges via the in-loop deblocker. For example, instead of requiring that all values between 100 and 100.5 will always be rounded down to 100, and all values between 100.5 and 101 will always be rounded up to 101, the deblocking process is configured to require that a value 100.x be randomly rounded up to 101 or down to 100 with probabilities that depend on the exact value of x.

According to another embodiment, an encoder is modified to ensure that the encoded video does not contain blocks in smooth areas in such a way that does not require the use of too many additional bits for encoding. It is understood that source data is naturally "noisy" or "dithered" in areas with smooth gradients due to the nature of the acquisition process. For example, a digital camera that is focused on a smooth gradient of color acquires a dithered image which appears smooth to the naked eye. Each successive frame of the source material has a different noise pattern due to the randomized nature of the content acquisition. This means that, to accurately compress the noise, a separate noise pattern has to be encoded for each frame. In general, noise does not compress well because of its naturally high entropy. Thus, representing noise accurately requires a lot of bits, if they are subsequently recovered with some fidelity.

The noise, however, does not need to be represented accurately since the human eyes are not sensitive to the exact geometry of noise, namely, one noise pattern appears to be similar to another noise pattern to the human eyes, provided the noise was caused statistically. This means that, instead of representing the original sequence of noise patterns in the source frames, it is possible to represent a different sequence of noise patterns in the encoded frames that appear substantially similar. The difference is that the sequence of noise patterns that are chosen to encode will be much more compressible than the original sequence.

In one embodiment, a first frame in a sequence (e.g., a GOP) is encoded with more bits and all I-blocks represent the noise accurately, if any. For succeeding frames, instead of representing the noise accurately for the frames, instead of reusing the noisy blocks from the previous frame, the encoding process is configured to move the blocks around using random motion vectors to provide an illusion of the noise that changes from frame to frame. These random motion vectors can be compressed very well, resulting in the use of very few extra bits.

According to another embodiment, a first frame in a sequence (e.g., a GOP) is again encoded with more bits to accurately represent the noise. The succeeding frames use P-blocks to encode only the difference from blocks represented in the first frame. Moreover, these P-blocks are themselves compressed by dropping the high-frequency components and encoding only the low-frequency components.

One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. The computer-readable media can also be distributed over network-coupled computer systems so that the computer-readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for minimizing blocking artifacts in an image, the method comprising:
   determining a pixel to be processed;
   defining a region with respect to the pixel, the region including at least eight other pixels;
   wherein determining the pixel to be processed includes making a determination as to whether a number of pixels in the region that have a digital value that differs from an average digital value of the total pixels in the region is less than a predefined number of pixels;
   upon determining that the number of pixels is less than the predefined number of pixels, performing a random selection of a replacement pixel in the region to replace the pixel;
   making a determination as to whether a digital level of the replacement pixel is within a threshold of a digital level of the pixel; and
   replacing the pixel with the replacement pixel upon determining that the digital level of the replacement pixel is within the threshold of the digital level of the pixel.

2. The method as recited in claim 1, wherein the determining of the pixel to be processed comprises scanning all pixels sequentially in the image.

3. The method as recited in claim 2, wherein the image is one of a plurality of frames in video data that is recovered from a compressed version thereof.

4. The method as recited in claim 3, wherein the compressed version is created from an original version in accordance with a standard.

5. The method as recited in claim 4, wherein the standard involves one or more compression techniques that operate on macroblocks that potentially cause the blocking artifacts.

6. The method as recited in claim 1, wherein the region is defined to be of quadrilateral, circle or vary in accordance with the pixel or surrounding pixels thereof.

7. The method as recited in claim 1, wherein the method is implemented in an in-line deblocker designated for a compression standard.

8. The method as recited in claim 7, wherein the compression standard is H.264.

9. The method as recited in claim 7, wherein each successive frame of original data material has a different noise pattern, the method further comprising:
   encoding a first frame in a sequence with more bits to represent noise accurately, if any in the first frame; and
   moving blocks around using random motion vectors to provide an illusion of the noise that changes from frame to frame.

10. The method as recited in claim 1, wherein the blocking artifacts are diffused by randomly selecting a replacement pixel in the defined region to replace a pixel contributing to the blocking artifacts.

11. A method for minimizing blocking artifacts in an image, the method comprising:
    determining a pixel to be processed;
    defining a region with respect to the pixel, the region including at least eight other pixels; and
    calculating a computed value for a replacement pixel in the defined region to replace the pixel, wherein calculating the computed value includes: (i) determining an average value of pixels in the region, (ii) determining an intermediate value between the average value and the pixel to be processed, (iii) weighting the intermediate value by an absolute value and a streak, wherein the streak represents the number of pixels in the region, and (iv) randomly rounding up or down the weighted value.

12. The method as recited in claim 11, wherein the determining of the pixel to be processed comprises scanning all pixels sequentially in the image.

13. The method as recited in claim 12, wherein the image is one of a plurality of frames in video data that is recovered from a compressed version thereof.

14. The method as recited in claim 13, wherein the compressed version is created from an original version in accordance with a standard.

15. The method as recited in claim 14, wherein the standard involves one or more compression techniques that operate on macroblocks that potentially cause the blocking artifacts.

16. The method as recited in claim 11, wherein the streak is recalculated after every pixel is processed.

17. A system for minimizing blocking artifacts in an image, the system comprising:
   memory for storing code as a deblocking module;
   a processor, coupled to the memory, executing the deblocking module to cause the system to perform operations of:
      determining a pixel to be processed;
      defining a region with respect to the pixel, the region including at least eight other pixels;
      wherein determining the pixel to be processed includes making a determination as to whether a number of pixels in the region that have a digital value that differs from an average digital value of the total pixels in the region is less than a predefined number of pixels;
      upon determining that the number of pixels is less than the predefined number of pixels, performing a random selection of a replacement pixel in the region to replace the pixel;
      making a determination as to whether a digital level of the replacement pixel is within a threshold of a digital level of the pixel; and
      replacing the pixel with the replacement pixel upon determining that the digital level of the replacement pixel is within the threshold of the digital level of the pixel.

18. The system as recited in claim 17, wherein the region is defined to be of quadrilateral, circle or vary in accordance with the pixel or surrounding pixels thereof.

19. The system as recited in claim 18, wherein the system is implemented in an in-line deblocker designated for a compression standard.

20. The system as recited in claim 19, wherein the compression standard is H.264.

21. The system as recited in claim 17, wherein each successive frame of original data material has a different noise pattern, the operations further comprising:
   encoding a first frame in a sequence with more bits to represent noise accurately, if any in the first frame; and
   moving blocks around using random motion vectors to provide an illusion of the noise that changes from frame to frame.

22. The system as recited in claim 17, wherein the blocking artifacts are diffused by randomly selecting a replacement pixel in the defined region to replace a pixel contributing to the blocking artifacts.

23. A system for minimizing blocking artifacts in an image, the system comprising:
   memory for storing code as a deblocking module;
   a processor, coupled to the memory, executing the deblocking module to cause the system to perform operations of:
      determining a pixel to be processed;
      defining a region with respect to the pixel, the region including at least eight other pixels; and
      calculating a computed value for a replacement pixel in the defined region to replace the pixel, wherein calculating the computed value includes: (i) determining an average value of pixels in the region, (ii) determining an intermediate value between the average value and the pixel to be processed, (iii) weighting the intermediate value by an absolute value and a streak, and (iv) randomly rounding up or down the weighted value.

24. The system as recited in claim 23, wherein the operations are performed on an image that is one of a plurality of frames in video data recovered from a compressed version thereof.

25. The system as recited in claim 23, wherein the streak is recalculated after every pixel is processed.

* * * * *